United States Patent
Ribani et al.

(10) Patent No.: US 10,742,844 B2
(45) Date of Patent: Aug. 11, 2020

(54) HIDING SENSITIVE DATA

(71) Applicant: Hewlett-Packard Development Company, L.P., Houston, TX (US)

(72) Inventors: Ricardo Ribani, Barueri (BR); Gabriela Matias Navarro, Barueri (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/079,657

(22) PCT Filed: Jun. 28, 2016

(86) PCT No.: PCT/US2016/039729
§ 371 (c)(1),
(2) Date: Aug. 24, 2018

(87) PCT Pub. No.: WO2018/004524
PCT Pub. Date: Jan. 4, 2018

(65) Prior Publication Data
US 2019/0075218 A1    Mar. 7, 2019

(51) Int. Cl.
*H04N 1/00*   (2006.01)
*G06F 3/12*   (2006.01)
*H04N 1/44*   (2006.01)
*G06K 9/00*   (2006.01)
*G06F 21/62*  (2013.01)

(52) U.S. Cl.
CPC ......... *H04N 1/4446* (2013.01); *G06F 3/1204* (2013.01); *G06F 3/1238* (2013.01); *G06F 21/6245* (2013.01); *G06K 9/00442* (2013.01); *H04N 1/00411* (2013.01); *H04N 1/00864* (2013.01)

(58) Field of Classification Search
CPC ........................... H04N 1/4446; G06F 3/1204
See application file for complete search history.

(56) References Cited

U.S. PATENT DOCUMENTS

| | | | |
|---|---|---|---|
| 7,770,220 B2 | 8/2010 | Fernstrom | |
| 8,098,395 B2 | 1/2012 | Ricoh | |
| 8,179,556 B2 | 5/2012 | Salgado et al. | |
| 8,446,607 B2 | 5/2013 | Zucker et al. | |
| 2006/0212711 A1* | 9/2006 | Tanimoto | G06F 21/645 713/178 |

(Continued)

OTHER PUBLICATIONS

Adobe Systems, "Redaction of Confidential Information in Electronic Documents", Mar. 6, 2006, 13 pages.

(Continued)

*Primary Examiner* — Ibrahim Siddo
(74) *Attorney, Agent, or Firm* — Brooks Cameron & Huebsch PLLP

(57) ABSTRACT

Example implementations relate to hiding sensitive data. For example, a device according to the present disclosure may include a scanning portion to receive a scan of a document, and a graphical user interface to receive a command with respect to the sensitive data. The device may also include a processor to analyze the scan of the document, process the command via the graphical user interface, determine the document contains sensitive data in response to the command, and perform an action to hide the sensitive data.

19 Claims, 5 Drawing Sheets

(56) References Cited

U.S. PATENT DOCUMENTS

| | | | |
|---|---|---|---|
| 2006/0259983 A1* | 11/2006 | Sperry | G06F 21/6245 |
| | | | 726/28 |
| 2006/0268362 A1* | 11/2006 | Bridges | H04N 1/00416 |
| | | | 358/450 |
| 2010/0033753 A1 | 2/2010 | Stephenson | |
| 2010/0118048 A1* | 5/2010 | Terry | G06T 11/60 |
| | | | 345/594 |
| 2011/0075166 A1 | 3/2011 | Goldwater et al. | |
| 2014/0157115 A1 | 6/2014 | Canon | |
| 2014/0208418 A1* | 7/2014 | Libin | G06F 21/6209 |
| | | | 726/19 |
| 2014/0268244 A1 | 9/2014 | Sheridan et al. | |
| 2015/0213283 A1 | 7/2015 | Ho | |
| 2016/0034717 A1* | 2/2016 | Keohane | H04L 67/10 |
| | | | 726/1 |

OTHER PUBLICATIONS

William Deutsch, "How to Redact a Pdf File", Dec. 10, 2014, 3 pages, http://bizsecurity.about.com/.

* cited by examiner

HIDING SENSITIVE DATA

BACKGROUND

Sensitive data is defined as data that is protected against unwarranted disclosure. Protection of sensitive data may be considered for legal, ethical, or other reasons, including issues pertaining to personal privacy, or for proprietary considerations.

DETAILED DESCRIPTION

Figure 1:
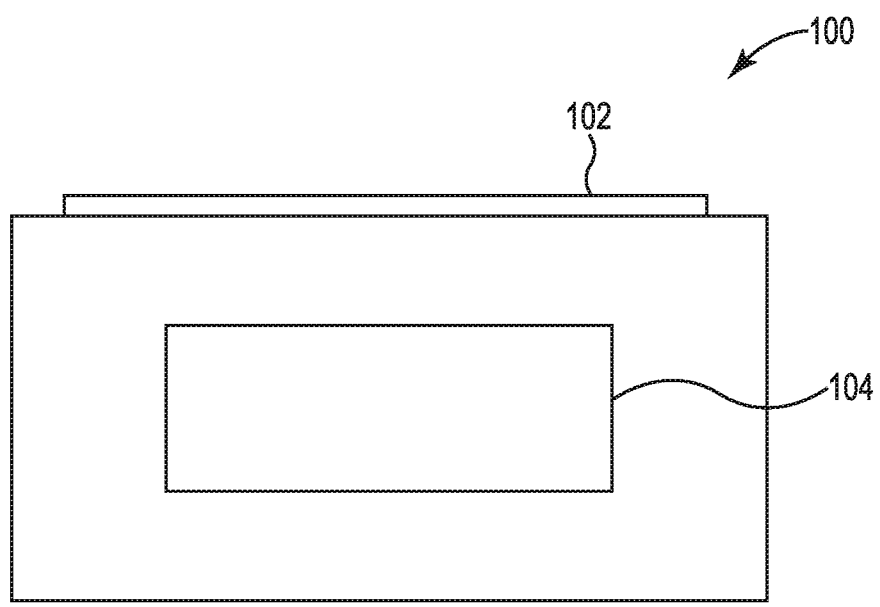
FIG. 1 illustrates a diagram of an example device, according to the present disclosure.

Hiding sensitive data from documents may be valuable to users. For instance, when a user copies a document, the user may want to remove sensitive data, such as a social security number, name, address, phone number, etc. As used herein, sensitive data refers to data that needs to be protected from unauthorized access to safeguard privacy and/or securing of an individual and/or organization. Sensitive data may include, for instance, personal data (e.g., Social Security Number, credit card number, financial data, etc.), business data (e.g., trade secrets, sales and marketing plans, financial data, etc.), and/or classified data (e.g., data subject to special security classification regulations). Some approaches to sensitive data removal require a user to make a copy of the document and then remove the sensitive data, for instance sending a scanned document to a computer with an image processing software and manually removing the data from the image by cropping or smudging the piece of the document that contains the sensitive data. The document then is sent back to a printer if printing is desired.

In contrast, examples of the present disclosure allow for the hiding of sensitive data on a single device such as a printing device. For instance, the device may receive a scan of a document containing seismic data. A preview of the document may be displayed on a panel located on the device, such as a GUI. Via the GUI, options may be presented to a user with respect to editing, limiting, and/or hiding certain information (e.g., the sensitive data) in the document. A preview of the newly edited document may be presented via the GUI, and once approval is received, the scanning process can be completed, No outside computing device or processor is necessary, as the device houses all necessary components and functionalities to complete the scanning and hiding of the sensitive data. In some examples, the device may print or send the scanned document upon receipt of such commands.

In addition, some prior approaches to sensitive data removal only allow for editing of textual data (e.g., text blocks) on a separate computing device and may require the use of optical character recognition (OCR). In contrast, examples of the present disclosure allow for hiding sensitive data located in an image or irregularly shaped item, without sending the document to a second device and without the use of OCR. For instance, by previewing the document via a GUI, commands to edit and/or hide sensitive data may be received at the single device, and these commands may include the removal of image data, a combination of image and textual data, and/or irregularly shaped data. For instance, a user may choose to hide sensitive data by circling the area to be hidden, and the device may hide that circular-shaped portion without sending the information to a different device (e.g., a separate computing device).

Examples of the present disclosure can simplify and quicken the hiding of sensitive data from a document and can increase security, as the document is not sent to another device, avoiding sending the document over a network that may not be encrypted. Examples of the present disclosure can also decrease costs by eliminating a need for a user license of image processing software and can eliminate a need for both a scanning/printing device and a computing device.

FIG. 1 illustrates a diagram of an example device 100, according to the present disclosure. Device 100 may be a printing device and/or a scanning device, for instance. Device 100 may include a scanning portion 102 to receive a scan of a document. For instance, a user may place a document on the scanning portion 102, and device 100 may receive the scan of the document. The scanned document can include textual data, image data, and/or irregularly shaped data, among others. The scan of the document, in some examples may include sensitive data such as, for instance, the user's Social Security Number.

Device 100 may include a GUI 104. GUI 104 may be a touchscreen GUI or other type of GUI that accepts user input. GUI 104 may be an interface that allows users to interact with device 100 through icons and visual indicators. GUI 104 may also allow for, in some instances, text-based interaction, typed interaction, and/or text navigation, among others. GUI 104 may receive and accept commands from a user with respect to the scanned document or other actions of device 100. These commands may include commands both related and unrelated to the sensitive data.

Figure 3:
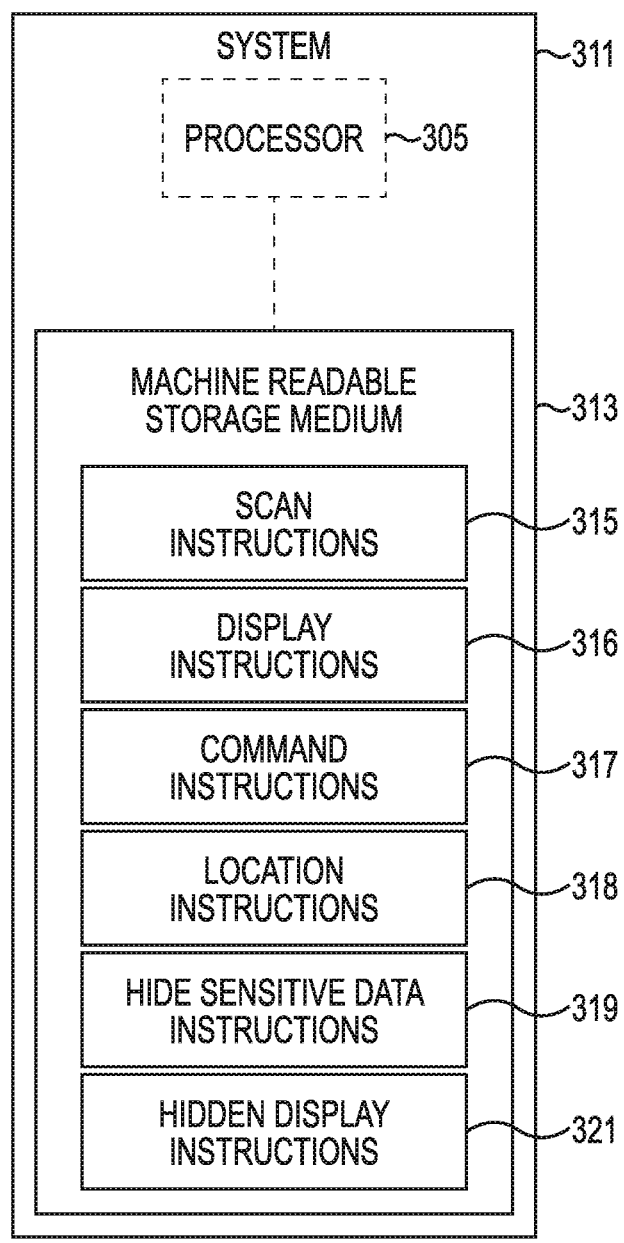
FIG. 3 is a block diagram of an example system for hiding sensitive data, according to the present disclosure.

Device 100 may include a processor (not illustrated in FIG. 1). The processor may be within device 100 and communicably coupled to scanning portion 102 and/or GUI 104. The processor may further be in communication with a machine-readable storage medium, as illustrated in FIG. 3. The processor may analyze the scan of the document received by the scanning device, process a command received at the GUI, make determinations with respect to sensitive data in the document based on the commands, and perform actions based on those determinations. Actions may include, for instance, cropping the sensitive data to hide it, blurring the sensitive data to hide it, and/or hiding a portion of the sensitive data, among others. These actions may be performed in response to commands received via GUI 104 in some instances.

Analyzing the scan may include determining whether or not the scanned document include sensitive data and/or determining whether the data (both sensitive and non-sensitive data) contained in the document is textual data, image data, irregularly-shaped data, and/or a combination of data types, Processing the command may include determining what the command is directing, including for instance, hiding a portion of or all of the sensitive data, zooming in or out on the scanned document via the GUI, etc.

The processor may also send the scanned document over a network. This may be to an email address, a cloud-based storage, and/or a network device, among others. For instance, a command may be received at device 100 (e.g., via GUI 104) to send the scanned document upon completion of the hiding of the sensitive data and finishing of the scan to an email address or other device (e.g., a computing device), This may be sent over a number of networks, including, for instance, a local area network, among others.

Device 100 may also include a printing portion to print the scanned document in response to the scanning portion 102 finishing the scan of the document. The scanning portion 102 may finish the scan in response to the performed actions noted above. In some examples, device 100 may be a printing device capable of printing documents. A command may be received at device 100 (e.g., via GUI 104) to print the scanned document upon completion of the hiding of the sensitive data and/or completion of the scan, for instance.

Device 100 may also include a database located on the device (not illustrated in FIG. 1) for storing the scanned document. For instance, upon completion of the scan, the scanned document (e.g., with sensitive data hidden) may be stored on the device alternatively to or in addition to sending the scanned document over a network and/or printing the scanned document.

Figure 2:
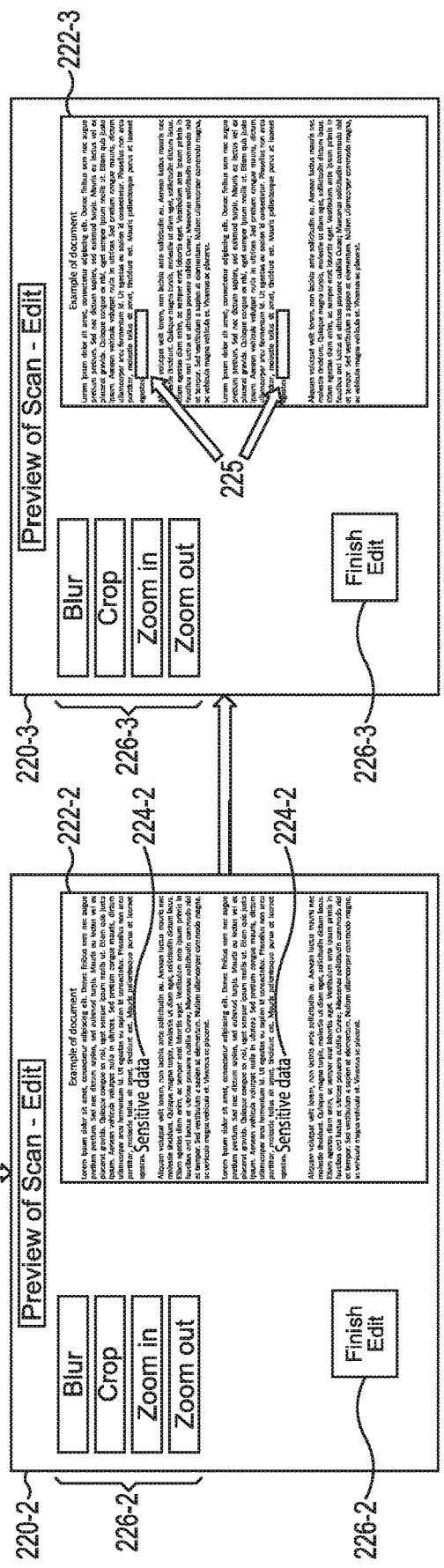
FIG. 2 illustrates a diagram of example graphical user interface (GUI) displays, according to the present disclosure.

FIG. 2 illustrates a diagram of an example GUI (e.g., GUI 104 illustrated in FIG. 1) at different stages 220-1, 220-2, and 220-3 of a scanning and/or sensitive data hiding process. While three stages are illustrated in FIG. 2, any number of stages may occur. The GUI may be located on a device, such as device 100 illustrated in FIG. 1. Stage 220-1 illustrates a preview 222-1 of a scanned document. The document may include textual data, image data, and/or a combination of the two. The document may also include sensitive data, as illustrated at 224-1.

Stage 220-1 may include a display of options 226-1 for a user including, for instance, "edit", "zoom in", and "zoom out", among others. A user may press one of these options to change the preview (e.g., "zoom in" to make it larger) or to change the document in some way (e.g., "edit" or "hide sensitive data", etc.). Stage 220-1 may also include a "finish scan" option 227. This option may be selected by a user if the user chooses not to edit the scanned document. Upon receiving this command, the device may complete the scan of the document.

Stage 220-2 may be a stage subsequent to that of stage 220-1. For instance, stage 220-2 may be displayed after the device receives a command from the user to edit the document. Stage 220-2 illustrates a preview 222-2 of the scanned document, as well as options 226-2. Options 226-2 may include, for instance, "zoom in" and "zoom out", as well as options for hiding sensitive data, such as "blur" and crop". A user may select one or more of" these options to edit and/or hide sensitive data 224-2. For instance, the device may receive a command via the GUI as to where the sensitive data is (e.g., by selecting via a touchscreen), and/or the device may identify the location of sensitive data automatically. As used herein, automatically means with limited or no user input and/or with limited or no prompting.

In response to the location of the sensitive data, a user may choose a method for hiding it, as well as which portions of the sensitive data to hide (e.g., some, all; certain types, etc.). Stage 220-2 may also include a "finish edit" option 226-2. A user may select this option if the user is satisfied with his or her edit and is ready to complete the scan of the document.

Stage 220-3 may be a stage subsequent to that of stage 220-2. For instance, stage 220-3 may be displayed in response to receiving a command to crop sensitive data 224-2. Like stages 220-1 and 220-2, stage 220-2 illustrates a preview 222-3 of the scanned document, as well as options 226-3.

However, preview 222-3 no longer includes visible sensitive data, but instead includes hidden sensitive data 225, which has been cropped out of the document in response to a command from a user. Options 226-3 may be the same or similar to options 226-2, and may allow for a user to further edit (or remove edits) on the scanned document 222-3. Stage 220-3 may also include "finish edit" option 226-3, which allows for finalization of the edit before finishing the scan. Upon completion of the edit, a user may see stage 220-1 again, with the preview 222-1 including hidden sensitive data, and with the "finish scan" option 227 available. Stage 220-1 or an alternative stage may also include an option to send the scanned document to another device (e.g., via a network) or to print the scanned document using the device. The command options 226-1, 226-2, 226-3 illustrated in FIG. 2 are meant to be examples. Command options may include more, fewer, and/or different options than those shown in FIG. 2.

FIG. 3 is a block diagram of an example system 311 for hiding sensitive data, according to the present disclosure. System 311 may include at least one computing device that is capable of communicating with at least one remote system. In the example of FIG. 3, system 311 includes a processor 305 and a machine-readable storage medium 313. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 305 may be one or more central processing units (CPUs), microprocessors, and/, or other hardware devices suitable for retrieval and execution of instructions stored in machine-readable storage medium 313. In the particular example shown in FIG. 3, processor 305 may receive, determine, and send instructions 315, 316, 317, 318, 319, and 321 for hiding sensitive data. As an alternative or in addition to retrieving and executing instructions, processor 305 may include one or more electronic circuits comprising a number of electronic components for performing the functionality of one or more of the instructions in machine-readable storage medium 313. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 313 may be any electronic, magnetic, optical, or other physical storage device that stores executable instructions. Thus, machine-readable storage medium 313 may be, for example, Random Access Memory (RAM), an Electrically-Erasable Programmable Read-Only Memory (EEPROM), a storage drive, an optical disc, and the like. Machine-readable storage medium 313 may be disposed within system 311, as shown in FIG. 3. In this situation, the executable instructions may be "installed" on the system 311. Additionally and/or alternatively, machine-readable storage medium 313 may be a portable, external or remote storage medium, for example, that allows system 311 to download the instructions from the portable/external/remote storage medium. In this situation, the executable instructions may be part of an "installation package". As described herein, machine-readable storage medium 313 may be encoded with executable instructions for hiding sensitive data.

Referring to FIG. 3, scan instructions 315, when executed by a processor (e.g., 305), may cause system 311 to analyze a scan of a document received at a device. As discussed with regard to FIG. 1, the scan may be received via scanning portion 102. For instance, a user may place a document on scanning portion 102, and device 100 may receive a command (e.g., via GUI 104 or another input) to scan the document.

Display instructions 316, when executed by a processor (e.g., 305), may cause system 311 to display the scan of the document via a GUI located on the device. As discussed with regard to FIG. 1, this GUI 104 may be located on device 100. For instance, a preview of the document, as illustrated in FIG. 2, may be displayed for review by a user and/or so a determination may be made with respect to sensitive data that may be contained in the document.

Command instructions 317, when executed by a processor (e.g., 305), may cause system 311 to receive a command via the GUI to hide sensitive image data from the scan of the document. In some instances, the sensitive image data may further include textual data, such that the sensitive data is a combination of both image and textual data. As discussed with regard to FIG. 1, the command can come via GUI 104.

Example commands received may include directions to blur and/or crop the sensitive data in order to hide it. For instance, it may be desired to blur a name, address, phone number, etc. from the document, making it unreadable. A user may select via the GUI, a word, number, phrase, etc. to hide. The command may include directions to hide a particular portion of the sensitive data. For instance, a Social Security Number may be hidden, while a name remains. A command may include, in some instances, directions to hide an irregularly shaped portion of the sensitive data. For instance, image data may be shaped irregularly (e.g., a person's face, a name located on a shirt in a photo, etc.). Additionally or alternatively, a command may include directions to hide a shape drawing by a user via the GUI of a portion of sensitive data to be hidden. For instance, a circle or other shape may be drawn by a user via the GUI (e.g., using a touchscreen) round a particular portion of the sensitive data to be hidden.

Command instructions 317 when executed by a processor (e.g., 305), may also cause system 311 to receive a command unrelated to the sensitive data. For instance, a user may want to get a closer view of the scanned document in the preview, so he or she may want to zoom in (or out) on the scanned document. In such an example, the device receives a command to zoom in or out (e.g., via the GUI), and in response, adjusts the preview of the scanned document accordingly. While zoomed in or out, the user may also edit the document. Other commands may be present on the GUI, as well.

The location instructions 318, when executed by a processor (e.g., 305), may cause system 311 to determine a location of the sensitive image data based on the command. For instance, based on the portion of sensitive data selected by the user, the device determines which sensitive data to hide. In some examples, the device may be able to locate the sensitive data based without user input. The device may present this as potential sensitive data to a user via the GUI. For instance, the device (e.g., via the processor) may identify and flag data within the scanned document that appears to include sensitive data, including personal data, business data, and/or classified data. A command may then be received via the GUI as to whether or not the user deems this flagged data to be sensitive data.

The hide sensitive data instructions 319, when executed by a processor (e.g., 305), may cause system 311 to hide the sensitive image data. The data may be hidden in a plurality of ways, including blurring, cropping, blacking out, and/or covering with another image, among others.

The hidden display instructions 321, when executed by a processor (e.g., 305), may cause system 311 to display the scan of the document with the sensitive image data hidden via the GUI. For instance, as discussed with regard to FIGS. 1 and 2, the scan with the hidden sensitive image data may be displayed via GUI 104 and as illustrated in stage 220-3. For instance, a user may be able to review a scanned document with the sensitive data hidden prior to completing a scan of the document. Edits and/or the hiding of the sensitive data may be adjusted, if desired, before finishing the scan.

System 311 may also include finish instructions (not illustrated in FIG. 3) that, when executed by a processor (e.g., 305), may cause system 311 to finish a scan of the document. For instance, in response to an approval of the display of the scanned document with the sensitive image data hidden, a command may be received (e.g., via the GUI) to complete a scan of the document (e.g., via the scanning portion of the device). Upon completion of the scan, commands may be received as to what action to take with respect to the completed scanned sensitive-image data-free document (e.g., email, save, etc.)

Figure 4:
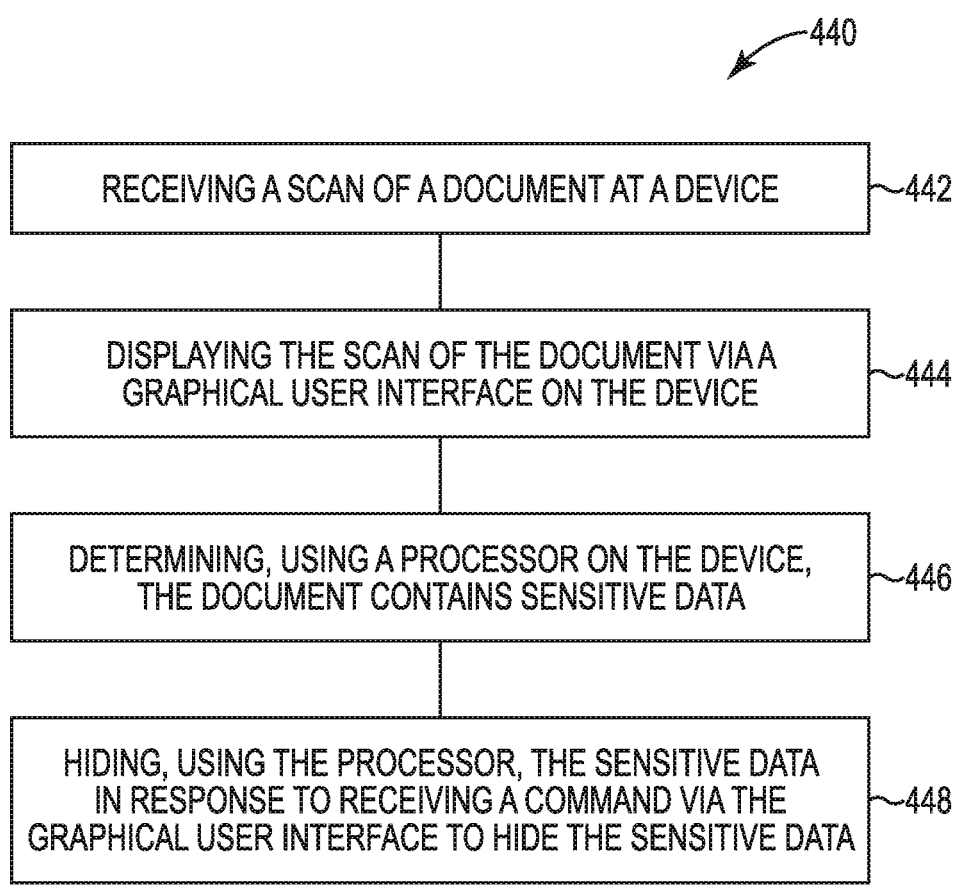
FIG. 4 illustrates an example method for hiding sensitive data, according to the present disclosure.

FIG. 4 illustrates an example method 440 for hiding sensitive data, according to the present disclosure. At 442, method 440 may include receiving a scan of a document at a device, such as device 100 as discussed in regards to FIG. 1. For instance, a user may place or insert a document onto or into a scanning portion of the device for scanning.

At 444, method 440 may include displaying the scan of the document via a GUI located on the device. A user may then view the scan on the GUI, which may include options for editing the document, as discussed with respect to GUI stages 220-1, 220-2, and 220-3 illustrated in FIG. 2. The GUI may be a touchscreen GUI, allowing for user input and editing through multi-touch gestures. Other screen and/or GUI types may be used, however.

Method 440 may include, at 446, determining, using a processor on the device, the document contains sensitive data. In some examples, the processor may automatically determine the document contains sensitive data. For instance, the processor may identify and flag potential sensitive data within the scanned document that appears to include personal data, business data, and/or classified data. In some instances, the processor may present this potential data to a user, and a command may then be received via the GUI as to whether or not the user deems this flagged data to be sensitive data. In other examples, the device may automatically hide the data it deems sensitive.

The processor, in some examples, may determine the document contains sensitive data based on a command received via the GUI. For instance, a user may choose the data he or she wants hidden using a touchscreen GUI, For instance, a user may select a start and an endpoint of sensitive data to be hidden. The sensitive data may be located in one location or in more than one location of the document. In an example where there are multiple locations of sensitive data, commands may be received at the device to hide a first starting to ending point, a second starting to ending point, and so on, until all the desired portions of the sensitive data are located in preparation for hiding.

At 448, method 440 may include hiding, using the processor, the sensitive data in response to receiving a command via the GUI to hide the sensitive data. The sensitive data may be hidden in a plurality of ways, including, for instance, blurring the sensitive data and/or cropping the sensitive data.

In some examples, method 440 can include display, via the GUI, the document with the sensitive data hidden. This allows for a preview of the document with the sensitive data hidden prior to completing the scan. The GUI may also display options for further editing of the document with the sensitive data hidden, as illustrated in stage 220-3 of FIG. 2.

Method 440 can also include printing, using the device, the document with the sensitive data hidden. For instance, in response to the sensitive data being hidden and the scanning portion of the device completing the scan, the device may print the document with the sensitive data hidden.

In some instances, method 440 can include sending, using the processor, the document over a network. For instance, in response to the sensitive data being hidden and the scanning portion of the device completing the scan, the processor may send the document with the sensitive data hidden over a network to an email address, cloud-based storage, network folder (e.g., common personal computer shared folder), and/or another device within or outside of the network, among others. In an example, cloud-based storage can include a sharepoint. In some instances, the processor can send the document with the sensitive data hidden to a database located on the device for storage.

Figure 5:
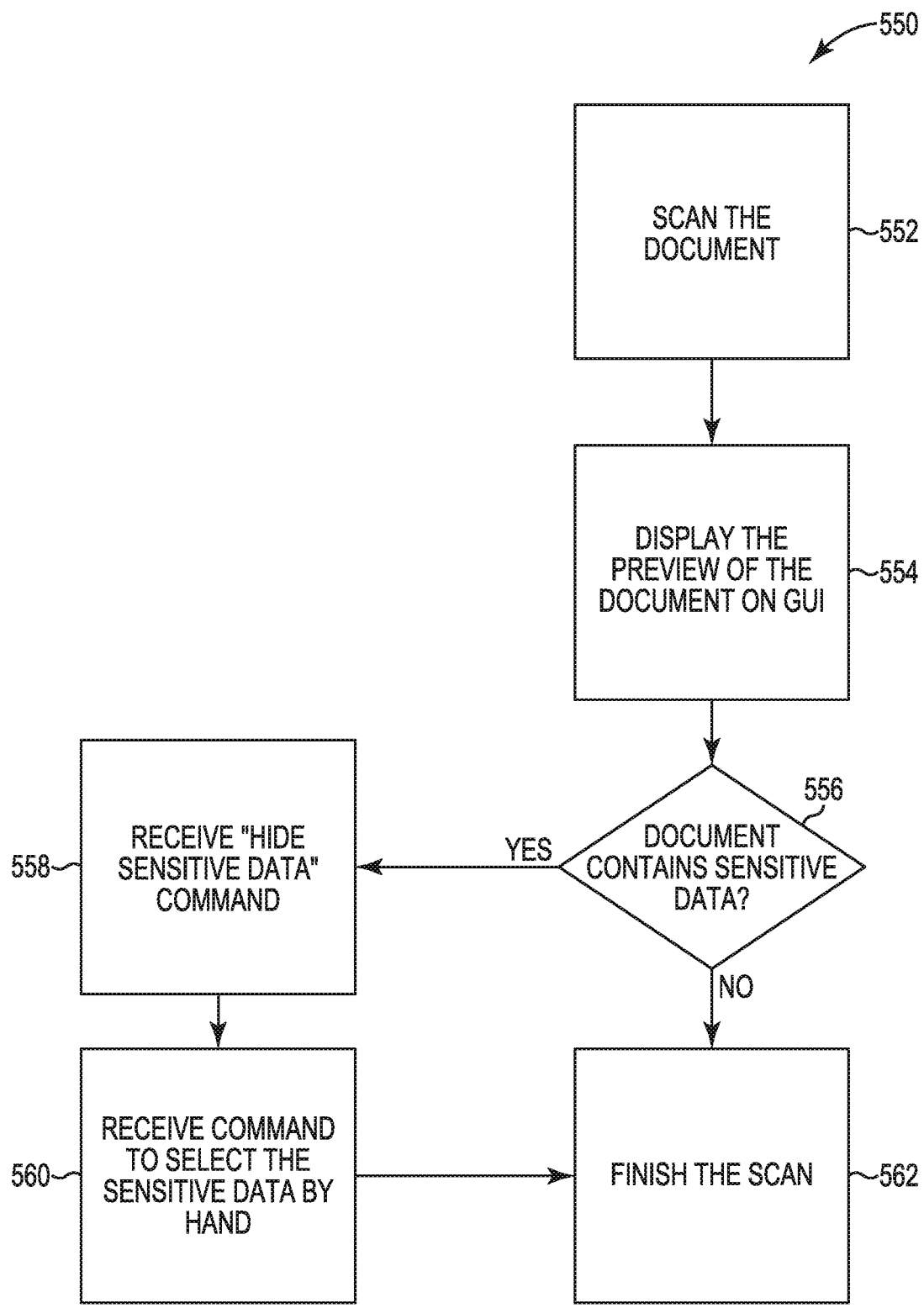
FIG. 5 illustrates an example method for hiding sensitive data, according to the present disclosure.

FIG. 5 illustrates an example method 550 for hiding sensitive data, according to the present disclosure, At 552, the method 550 may include scanning a document and/or receiving a scan of a document at a scanning portion of a device, such as scanning portion 102 and device 100, as discussed in regards to FIG. 1, A preview of the scanned document may be displayed via a GUI located on the device. The preview may be in the form of an image and/or text, and the scanned document may include image data, textual data, irregularly shaped data, and/or other data formats.

At 556, a determination is made as to whether or not the document contains sensitive data. This determination may be made in response to a command received via a GUI on the device, and/or it may be made automatically by a processor located on the device. If a determination is made that the document does not contain sensitive data, the scan is completed at 562.

If a determination is made that the document does contain sensitive data, at 558 a command may be received via a GUI on the device to hide the sensitive data. For instance, a user may press a button on the GUI (e.g., via a touch-screen) labeled "Edit' or "Hide Sensitive Data", However, these are only examples of buttons, and optional commands are not so limited.

At 560, a command may be received via the GUI to hide a particular portion (or all) of the sensitive data. In response to receiving a command to edit the document, for instance, a user may be presented with a new screen and may select by hand a portion of the sensitive data to hide. Once the selected sensitive data is hidden, the scan may be finished at 562.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A device comprising:
   a scanning portion to scan a document in which sensitive data is viewable;
   a graphical user interface to display the scan of the document with the sensitive data being viewable and to receive a command with respect to the sensitive data depicted in the document; and
   a processor to:
      in response to the command and without sending the document over a network, determine the document contains sensitive image data depicting a captured image of an object; and
      perform an action to hide the sensitive image data from the scanned document and to generate an electronic version of the scanned document in which the sensitive image data is not accessible;
   the scanning portion to finish the scan of the document in response to the performed action; and
   a printing portion to subsequently print the document with the sensitive image data removed, after the action to hide the sensitive image data is performed.

2. The device of claim 1, further comprising:
   the processor to subsequently send the document over a network.

3. The device of claim 1, further comprising a database located on the device to store the scan of the document with the sensitive image data removed.

4. The device of claim 1, wherein
   the graphical user interface is to:
      display the scan of the document and the sensitive image data, and
      receive the command indicative of a location or content of the sensitive image data depicted in the displayed scan; and
   the processor is to:
      determine the location of the sensitive image data based on the received command and the location or content of the sensitive image data depicted in the displayed scan, and perform the action to hide the sensitive image data by altering the sensitive image data and generating a scanned version of the document with the sensitive image data altered.

5. The device of claim 4, wherein the processor is to perform the action to hide the sensitive image data by, in response to the received command being indicative of content of the sensitive image data, search the scan of the document for instances of the content, and alter each instance of the sensitive image data to render the sensitive image date inaccessible in the generated scanned version of the document.

6. The device of claim 4, wherein
the graphical user interface is to receive the command indicative of the location of the sensitive image data based on a user selection of a region of a touch screen on which the scan of the document is depicted; and
the processor is to determine the location of the sensitive image data based on the location of the data and the region of the touch screen selected by the user, and to alter the sensitive image data by obscuring text and images displayed within the region of the touch screen.

7. A method, comprising:
scanning, using a device, a document in which sensitive data is viewable;
displaying a scan of the document including the sensitive data via a graphical user interface located on the device;
determining, using a processor located on the device and without sending the document over a network, that the document contains sensitive image data depicting a captured image of an object;
performing an action to hide, using the processor, the sensitive image data from the scan of the document in response to receiving a command via the graphical user interface to hide the sensitive image data;
finishing the scan of the document, using the processor, in response to the performed action; and
generating, using the processor, an electronic version of the scanned document in which the hidden sensitive image data is inaccessible.

8. The method of claim 7, further comprising displaying, via the graphical user interface, the generated electronic version of the document with the sensitive image data hidden.

9. The method of claim 7, further comprising printing, using the device, the generated electronic version of the document with the sensitive image data hidden.

10. The method of claim 7, further comprising sending, using the processor, the generated electronic version of the document over a network to an email address.

11. The method of claim 7, further comprising sending, using the processor, the generated electronic version of the document over a network to at least one of cloud-based storage and a network folder.

12. The method of claim 7, further comprising automatically determining, using the processor, the document contains sensitive image data.

13. A non-transitory machine-readable medium containing instructions executable by a processor to:
scan, using a device, a document in which sensitive data is viewable;
display the scan of the document via a graphical user interface located on the device;
receive a command via the graphical user interface to hide sensitive image data from the scan of the document, the sensitive image data depicting a captured image of an object;
determine a location of the sensitive image data based on the command;
perform an action to hide the sensitive image data by covering the sensitive image data with another image;
finish the scan of the document in response to the performed action; and
display the scan of the document with the sensitive image data hidden via the graphical user interface.

14. The non-transitory machine-readable medium of claim 13, wherein the sensitive image data comprises irregularly-shaped image data captured in a photograph.

15. The non-transitory machine-readable medium of claim 13, wherein the sensitive image data further comprises textual data.

16. The non-transitory machine-readable medium of claim 13, further comprising the instructions executable by the processor to hide the sensitive image data by blurring the sensitive image data.

17. The non-transitory machine-readable medium of claim 13, further comprising the instructions executable by the processor to hide the sensitive image data by cropping the sensitive image data.

18. The non-transitory machine-readable medium of claim 13, wherein the instructions to receive a command via the graphical user interface includes instructions to receive a user-drawn shape via the graphical user interface, a particular portion of the sensitive image data to be hidden.

19. The non-transitory machine-readable medium of claim 13, wherein the document includes a photograph, and wherein the instructions to receive a command via the graphical user interface to hide sensitive image data from the scan of the document include instructions to receive a command to hide irregularly shaped image data in the photograph to be hidden.

* * * * *